United States Patent [19]

Sterlini

[11] 3,730,494

[45] May 1, 1973

[54] METHOD AND APPARATUS FOR INTIMATELY CONTACTING A GAS AND A LIQUID

[75] Inventor: Jacques Sterlini, Paris 18° (Seine), France

[73] Assignee: Societe Anonyme Compagnie Electro-Mecanique, Paris, France

[22] Filed: Aug. 22, 1972

[21] Appl. No.: 282,865

[30] Foreign Application Priority Data

Sept. 3, 1971 France................................7131931

[52] U.S. Cl......................261/21, 261/29, 261/79 A, 261/122, 55/235, 259/4
[51] Int. Cl.................................................B01f 3/04
[58] Field of Search.........................55/235, 237, 238, 55/257; 259/4; 261/21, 29, 36, 37, 79 A, DIG. 54, 122, 123

[56] References Cited

UNITED STATES PATENTS 3,514,924  6/1970  Flebu...................................261/79 A Primary Examiner—Tim R. Miles
Assistant Examiner—Steven H. Markowitz
Attorney—Maxwell James et al.

[57] ABSTRACT

Apparatus is described for intimately contacting a gas with a liquid comprising a plurality of liquid/gas contacting means formed by walls defining a plurality of channels extending in the same direction about a central axis of the apparatus, each of said channels providing successively a divergent zone in which an opening is provided in the outer wall of the channel, an expansion nozzle, a convergent zone in which an opening is provided in the inner wall of the channel, and an enclosed divergent zone, said channels being interconnected with one another both end to end and by the openings in the inner and outer walls respectively of radially adjacent channels being made coincident, the openings in the outer walls of the radially outermost channels being in communication with means for connection to a source of pressurized gas, and the openings in the inner walls of the radially innermost channels being in communication with a gas outlet.

21 Claims, 3 Drawing Figures

METHOD AND APPARATUS FOR INTIMATELY CONTACTING A GAS AND A LIQUID

FIELD OF THE INVENTION

The invention relates to a method and apparatus for intimately contacting a gas and a liquid, particularly suitable for use when such contact must occur under controlled conditions in the course of physical and/or chemical processes.

SUMMARY OF THE PRIOR ART

The inventor has already described methods and apparatus for bringing a gas and a liquid into intimate contact, for example for the purpose of effecting heat exchange, a chemical reaction, or dissolution of the gas in the liquid, in his assignees' French Patent Application No. 70 02,814 filed on Jan. 27, 1970 and a first Certificate of Addition relating thereto and filed on January 26, 1971 under No. 71 02,535.

The process already described essentially involves an operating sequence comprising forming an emulsion of pressurized gas in a pressurized liquid, expanding the emulsion formed, separating the gas from the expanded emulsion, and preferably recompressing and circulating the liquid to the emulsifying stage of the same or another sequence.

In typical apparatus described for carrying out a process of this kind, there are provided, arranged in series in the direction of liquid flow, means for injection of a gas into a liquid situated in a high pressure zone, an expansion nozzle receiving the gas-liquid emulsion formed in the high pressure zone, means for separating the gas from the expanded emulsion received from said nozzle, and means comprising a divergent channel to recompress the liquid from said emulsion. On expansion of the emulsion, the energy given up by the expanding gas phase is transferred as kinetic energy to the liquid phase which is hence accelerated, subsequent deceleration of the separated liquid as it circulates to the high pressure zone of the same or another apparatus through the divergent zone resulting in an increase in its potential energy and hence repressurization. The apparatus is therefore in the general form of a closed loop, and is basically of relatively simple construction. The operating cycle of apparatus of this kind provides all the stages of a thermodynamic cycle in the course of which the gas gives up energy to the liquid.

However, apparatus of this kind does not permit the carrying out of a process in which a gas and a liquid must flow in countercurrent, unless a series of the apparatus are connected so that the flows of the gas and the liquid in relation to the series as a whole are in countercurrent. moreover, the actual dimensions of a particular apparatus will impose restrictions upon the liquid gas volume ratios which can be utilized so that the gas/ liquid ratio cannot be modified at will. Finally, the closed loop construction of the apparatus does not lend itself to optimum space utilization.

SUMMARY OF THE INVENTION

The object of the present invention is to provide an improvement of the method and apparatus referred to above with the purpose of enabling intimate contact to be achieved between a gas and a liquid in a more versatile and flexible manner and at any desired gas/liquid ratio.

More particularly, the invention is directed to a process of intimately contacting a gas and a liquid, comprising contacting the gas and liquid in a plurality of continuously operating sequences each comprising four successive stages as follows;

a. forming an emulsion of a supply of pressurized gas in a flow of liquid at a pressure close to that of the gas, b. permitting the emulsion so formed to expand so as to accelerate its flow, c. permitting the accelerated gas flow to separate from the accelerated liquid flow, and d. decelerating and hence recompressing the liquid at least to its initial pressure in stage (a);

wherein the plurality of operating sequences are simultaneously operated in adjacent zones with the gas proceeding between the sequences by means of a first type of transfer in which the accelerated gas flow from stage (c) of one operating sequence is directed as the pressurized gas supply to stage (a) of a second operating sequence, and a second type of transfer in which the stage (a) of said first operating sequence receives its supply of pressurized gas from stage (c) of a third operating sequence, and wherein stage (c) of said first operating sequence is carried out in contact with stage (a) of said second operating sequence, the flows in the two stages having the same general direction and stage (a) of the first operating sequence is carried out in contact with stage (c) of said third operating sequence, the flows in the two stages having the same general direction. Thus an accelerated flow of liquid charged with gas in the first sequence is brought into contact with a flow of liquid in the second sequence, the speed of which flow is lower than that of said accelerated flow and from which the gas has been substantially separated,these two flows having the same general direction, these two flows having the same general direction, this being done so that almost all the gas present in the first sequence is transferred to the second.

By providing a suitable topological arrangement of the zones in which the plurality of sequences take place, it is hence possible to pass the gas successively through any numbers of such sequences.

The invention further permits the transfer of gas from one sequence to another to be accompanied where required by a simultaneous transfer of a portion of liquid between the sequences either in the same direction as or in countercurrent to the gas flow.

Preferably the boundary along which stage (c) of the first operating sequence and stage (a) of the second operating sequence are operated in contact extends generally parallel the direction of flow in the two contacting stages, the rate of flow in stage (c) of the first operating sequence being the higher.

Preferably also the two contacting stages are operated so that the flows therein follow generally concentric curvilinear paths, the flow in stage (c) of the first operating sequence following a path of larger radius.

The plurality of sequences are preferably arranged in a plurality of groups, the sequences in any one of said groups being arranged end to end in a repeating series so far as the flow of liquid is concerned, the total flow of gas being processed being divided between the sequences in each group in proportion to the number of sequences in the group.

The invention also relates to apparatus for contacting a gas with a liquid by the process which has just been described, comprising a plurality of liquid/gas contacting means formed by walls defining a plurality of channels extending in the same direction about a central axis of the apparatus, each of said channels providing successively a divergent zone in which an opening is provided in the outer wall of the channel, an expansion nozzle, a convergent zone in which an opening is provided in the inner wall of the channel, and an enclosed divergent zone, said channels being interconnected with one another both end to end and by the openings in the inner and outer walls respectively of radially adjacent channels being made coincident, the openings in the outer walls of the radially outermost channels being in communication with means for connection to a source of pressurized gas, and the openings in the inner walls of the radially innermost channels being in communication with a gas outlet.

Preferably, said channels are arranged end to end in closed loops about the central axis to form a plurality of groups each comprising the same number of contacting means, the openings in the inner walls of the channels of one group coinciding with the openings in the outer walls of the channels of the group next within said first group, the openings in the outer walls of the channels of the outermost group being in communication with the means for connecting said openings to a course of pressurized gas, and the openings in the inner walls of the channels of the innermost group being in communication with the gas outlet.

The expansion nozzles defined by the channel of each contacting means may advantageously be in the form of a venturi if the flow rate of the emulsion is supersonic.

Preferably the means for connecting said openings in the outer walls of the channels of the outermost group of contacting means each comprise gas admission means communicating with an intermediate chamber having a perforated plate forming one wall thereof and bounding said opening.

In a preferred embodiment of the complete apparatus has the general shape of a cylinder the axis of which coincides with the axis about which the channels extend.

The invention is described further below with reference to the accompanying drawings, in which:

FIG. 1 is a fragmentary diagrammatic view of part of apparatus in accordance with the invention, FIG. 2 is a diagram illustrating the mode of operation of the invention, and FIG. 3 is a diagrammatic cross-section of an exemplary embodiment of apparatus in accordance with the invention.

DESCRIPTION OF THE PREFERRED EMBODIMENT

Figure 1:
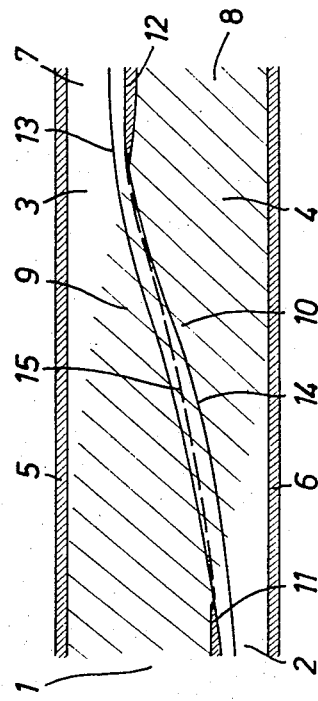

Reference will first be made to FIG. 1, which shows portions of two adjacent channels in an apparatus according to the invention, the inner (lower as shown in the drawing) channel having an opening in its outer (upper) wall which coincides with a opening in the inner (lower) wall of the upper (outer) channel. The coarsely hatched areas of the channels contain a gas in liquid emulsion and the unhatched areas contain unemulsified liquid. The direction of flow through the channels is from left to right. The outer channel has an outer wall 5 and the inner channel an inner wall 6. The inner and outer walls respectively of these two channels are provided by a common wall of which portions 11 and 12 are shown bounding the common opening which provides the coincident openings in the walls of the two channels.

Upon entering the zones of the channels shown in FIG. 1 the liquids flowing in the two channels come in contact once they pass the tapered end of the wall portion 11. The fluid in the portion 1 of the outer channel is a gas in liquid emulsion travelling at relatively high velocity, whilst the fluid in the portion 2 of the inner channel is a liquid substantially uncharged with gas and travelling at a relatively lower velocity.

The inventor has found that in a moving stream of gas in liquid emulsion, in which both a velocity gradient and a gas concentration gradient occur in the same direction transverse to the direction of flow, the gas component of the emulsion will migrate transversely to the direction of the flow from the high velocity side of the stream toward the low velocity side, thus reversing the direction of the gas concentration gradient.

This property of emulsion is made use of in the present invention in the manner illustrated in FIG. 1. Because of the nature of the two fluid flows being brought in contact, the conditions for migration which are set out above are fulfilled and substantially the whole of the gas content of the emulsion in the outer channel at 1 migrates into the liquid in the inner channel and emulsifies this liquid.

It was in addition found that the phenomenon referred to is intensified:

1. if there is a negative pressure gradient in the direction of flow, i.e., the gas is expanding, 2. if there is negative pressure gradient extending in the same direction as the gas concentration gradient.

These conditions may be achieved by 1. ensuring that the region, comprising the zones in which gas is respectively separated from the fluid in the outer channel and transferred to emulsify the liquid in the inner channel, bounded by the solid walls 5 and 6, is generally divergent in form so as to give rise to a general expansion of the stream or gas passing therethrough, and/or 2. a pressure gradient extending oppositely to the gas concentration gradient is obtained by giving the channels a curvilinear form with the outer channel on the outside of the curve.

Downstream of the transfer region (at the right in FIG. 1), the two liquid flows are again separated by a sharp leading edge of the wall portion 12, the flow entering a portion 7 of the outer channel comprising practically pure liquid comprising the liquid content of the emulsion entering the region through the portion 1 of the outer channel, the boundary of this flow of the liquid phase being indicated by the line 13. Optionally, the liquid entering the portion 7 may comprise a part, usually a small part, of the liquid flow from the channel portion 2, as illustrated by the area in FIG. 1 between lines 13 and 14, the latter marking the boundary of that part of the flow channel portion 1 which enters a portion 8 of the inner channel. However, this latter part of the flow has been emulsified by the gas transferred to it.

It will be understood therefore that the passage of the fluid flows in the inner and outer channels through the region shown in FIG. 1 has brought about;

1. the separation of the gas from the emulsion in the outer channel and the emulsification of the liquid in the inner channel,
2. the transfer of substantially all the gas from the outer channel to the inner channel, and
3. the optional transfer of part of the liquid flowing in the inner channel to the outer channel.

Since the proportion of the liquid flow transferred is small in relation to the total flow in each channel, it is legitimate to consider that the portions 1 and 7 form parts of the same outer channel, and that the portions 2 and 8 form parts of the same inner channel. It is therefore convenient to consider the two channels in the actual region where their fluid streams come in contact as divided by an imaginary boundary 15 extending substantially parallel to the fluid flow in the channels connecting the trailing edge of the wall portion 11 with the leading edge of the wall portion 12 across the gap which forms coincident openings in the two channels.

This boundary 15 represents the contact between two zones in the respective channels, the zone 9 in which the emulsion in the outer channel is separated into liquid and gas, transfer of the gas occurring across the frontier 15 into the liquid flowing in the inner channel. This transfer of gas from the outer channel will be referred to as transfer of the first type, whilst the transfer of gas to the inner channel will be referred to as transfer of the second type. The first type of transfer may be accompanied as described with the transfer to the outer channel of a portion of the liquid flow in the inner channel. Similarly the second type of transfer will in this case be accompanied by the transfer from the inner channel of a portion of the liquid flow therein. It is perfectly possible for it to be arranged for the liquid transfer to occur in the opposite direction, that is to say in the same direction as the transfer of gas instead of in countercurrent to the latter.

In order to simplify the explanation, it will be assumed hereinbelow that the transfer of liquid, where it occurs, is in countercurrent to the transfer of gas; in this case the liquid must obviously be pressurized in passing through the apparatus.

The transfer of gas and liquid between two adjacent channels has been described above with reference to FIG. 1; however, FIG. 1 illustrates only a small part of the method of the invention in which a plurality of operating sequences are carried out in adjacent channels and linked by such transfers.

Each operating sequence involves four successive stages, these being (a) forming an emulsion of a supply of pressurized gas in a flow of liquid at a pressure close to that of the gas, (b) permitting the emulsion so formed to expand so as to accelerate its flow, (c) permitting the accelerated gas flow to separate from the accelerated liquid flow, and (d) directing the liquid along a divergent channel to decelerate and hence recompress the liquid at least to its initial pressure in stage (a). Of these several stages, stage (a) and (c) of two different sequences have been described in detail with reference to FIG. 1, and further description of the remaining stages will be found below in the description associated with FIG. 3.

In the method of the invention the operating sequences are combined, so that the stages (a) and (c) of adjacent sequences are operated in contact as described more fully with reference to FIG. 1 and hence the first type of transfer takes place with the stage (c) of a first sequence operating in a zone in contact along a boundary 15 with a zone in which stage (a) of a second sequence is being operated; and likewise stage (a) of said first sequence is operated in a zone in contact with a zone in which stage (c) of a third sequence is being operated. In a preferred arrangement, as is described more fully below, the first, second and third sequences are all members of sequences operated in series to provide closed loops providing repeated sequences of the steps (a), (b), (c) and (d) operated in a plurality of channels joined end to end.

The zones $a$, $b$, $c$ and $d$ of each channel illustrated are identified by double indices indicating the rank of the group in which the sequence occurs. Thus the zones of the channel bounded by the letters A, B, C and D are identified by the index $(i,j)$, those of the preceding and succeeding series connected channels by the indices $(i-1,j)$ and $(i+1,j)$, and those of the channels communicating therewith and associated with sequences in adjacent groups by the indices $(i,j-1)$ and $(i,j+1)$.

Disregarding transfer of liquid across the boundary 15, the liquid flow through the channels associated with the several sequences in such a group passes in series through all the operating sequences of that group. The channels in which the sequences are carried out are linked for the purposes of transfers of the first and second type in the manner illustrated in FIG. 1.

Figure 2:
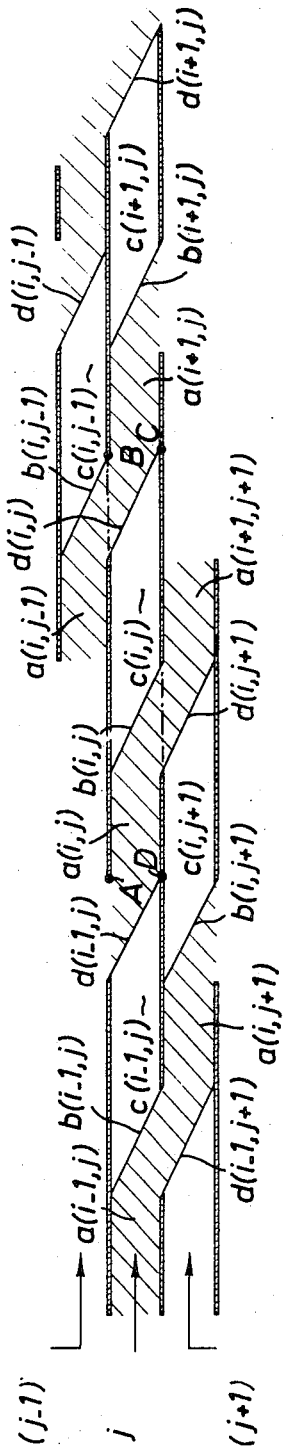

FIG. 2 illustrates diagrammatically the operation of a rather more extensive portion of apparatus according to the invention than does FIG. 1. FIG. 2 shows more particularly the operation of a sequence of rank $i$ in a group of rank $i$, the operation of adjacent sequences in adjacent channels also being shown. The stage (b) of each sequence is operated in an expansion zone $a$ of each channel, the stage (c) of each sequence is operated in a separation zone $b$ of each channel, the stage (d) of each sequence is operated in a recompression zone $c$ of each channel, and the stage (a) of each sequence is operation in an emulsification zone $d$ of each channel. Although one channel is associated with each sequence, the actual point of separation between successive sequences and channels in the same groups is selected arbitrarily. In FIG. 2, the sequence principally illustrated is operated in a channel considered to be bounded by the points A, B, C and D.

In FIG. 2 the emulsified portions of the flow through the channels are again hatched, and the unemulsified portions consequently appear unhatched. For the purpose of explanation, series connected channels are shown laid out in a straight line, through it should be understood that the groups of channels will form closed loops one within the other with the highest ranking group innermost.

It can be seen that each separation zone $b$ is in communication with an emulsification zone $d$ of an adjacent stage. In these zones the notional boundaries between the channels are represented by dot-dash lines.

It will initially be assumed for the purpose of explanation that there is no pressure gradient across these boundaries; this supposition is not incompatible with the closed loop arrangement of the channels because these could be shaped so that the necessary curved portions are situated solely in zones other than those involved in the two types of transfer as has already been described with reference to FIG. 1. Such absence of pressure gradients does not inhibit correct gas transfer; nevertheless it is a special condition which will not generally be achieved in practice and is assumed here solely in order to simplify the first portion of the explanation given below.

The zone $a$ $(i, j)$ which is in the form of a nozzle though not shown as such, is the emulsion expansion zone of the sequence $(i, j)$ in series (from the point of view of the emulsion) with the emulsification zone $d(i-1,j)$ of the preceding sequence; on entering the expansion zone the velocity of the emulsion increases while is pressure decreases to the minimum value which it will at any point in the sequence as it enters the zone $b$ $(i,j)$.

The zone $b$ $(i, j)$ in series, from the point of view of the emulsion, with zone $a$ $(i, j)$, is the separation zone of the stage $j$, and is in contact through the opening in the channel wall with the emulsification zone $d$ $(i, j+1)$ in the group $j+1$, to the liquid in which it gives up its gas and from which is received a flow of liquid in the manner already described with reference to Figure.

The zone $c$ $(i,j)$, in series, from the point of view of the flow of liquid in the channel, with $b$ $(i,j)$, is a closed divergent section (although not shown as such) in which the velocity of the liquid decreases and its pressure increases to the maximum value which it has at any point in the sequence $(i,j)$, or indeed in any of the sequences in the group $j$, as it enters the zone $d$ $(i,j)$.

The zone $d$ $(i,j)$, in series from the point of view of the liquid flow with zone $c$ $(i,j)$, is an emulsification zone in contact with the zone $b$ $(i, j-1)$ of the group $j-1$, from which it receives the gas separated in the latter zone, and to which it gives up a part of its flow of liquid substantially equal to that received by the zone $b$ $(i,j)$.

The flow at the end of the zone $d$ $(i,j)$ has the same physical characteristics in terms of gas and liquid flows and thermodyanamic conditions as the flow at the end of zone $d$ $(i-1,j)$.

It is therefore seen that the minimum pressure in each stage is found in its zone $b$, and the maximum pressure in each stage is found in its zone $d$. However, we have assumed that where zones $b$ and $d$ of sequences in adjacent groups are in contact, there is no pressure gradient across the boundary, i.e., both zones are of the same pressure. This entails that the mean pressure in the sequences of the group $j$ must be higher than the means pressure in the sequences of the group $j+1$; succeeding groups are thus operated at incrementally reducing pressures. Where there are pressure gradients across the boundary between contacting zones, this gradient is caused by centrifugal force resulting from curvature of the channels in these zones. Consequently these gradients will be in such a sense as to augment the incremental decrease already described: any pressure gradient existing longitudinally of the contacting zones will not modify this result.

Thus, the arrangement of FIG. 2 makes it possible to effect the transfer of almost all the gas from a higher pressure group of sequences to a group at lower pressure and, in the particular case considered, simultaneously to effect the transfer of an flow of liquid from a lower pressure group to a group at higher pressure. This transferred flow of liquid is therefore subjected to a pumping action; the magnitude of the flow between each pair of adjacent groups must of course be the same, subject to any changes of phase that may take place as between liquid and gas due to evaporation dissolution or chemical reaction.

The operating sequences in each terminal group are of a special construction. The sequences in the innermost, lowest pressure,group have openings in the inner walls of their separation zones $b$ from which the separated gas may pass to a gas outlet together with inlet orifices through which liquid may be supplied to their emulsification zones $d$. Likewise, the sequences of the outermost, highest pressure, group have pressurized gas inlets connected by an emulsifier to their emulsification zones $d$ together with outlets for liquid connected to their zones $b$.

Taking these special terminal groups together with the ordinary groups intermediate them and described with reference to FIG. 2, the total effect achieved is that the gas under pressure introduced into the outermost group passes from group to group until it leaves the innermost group, expanding in each group and consequently giving up energy as a result of this expansion, firstly to the liquid flow recirculating through the sequences of each group, in order to compensate for mechanical losses incurred during this recirculation, and secondly to the liquid introduced into the innermost group and being transferred from lower to higher pressure groups until it leaves the outermost group.

it is thus seen that in the case described the paths of the gas and of the liquid are as a whole in countercurrent to one another; without departing from the scope of the invention however the direction of flow of the transferred liquid may be reversed.

Throughout their entire paths the gas and the liquid are in very intimate contact both in the expansion zones and in the separation and emulsification zones.

The ratio of the mass flows of the transferred liquid and of the gas may be adjusted to any desired value whatever the conditions of operation imposed in other respects such as temperature and pressure, merely by externally controlling the circulation of the transferred liquid by the provision of an external pump or flow restrictor.

This result is advantageous and is worthy of emphasis. it is in fact possible to control externally the flow of liquid pumped through the apparatus, and the energy required to achieve this pumping can as described above be wholly or partially derived from the potential energy of the pressurized gas introduced into the apparatus.

In the prior art process described in the introduction of this specification, it was possible when this was operated in a loop type apparatus also to obtain an outgoing flow of pressurized liquid in which case the apparatus functioned in the manner of an ejector. The liquid however passed from its low pressure to its high outlet pressure in a single operating sequence, which entailed rather high theoretical losses. In the process according to the present invention this ejector effect is also obtained as will have been understood from the foregoing description, but the increase in pressure is achieved incrementally by a plurality of sequences in a plurality of groups so that the theoretical losses are here very much lower.

It will be understood from the foregoing that the process of the invention makes it possible for gas and liquid flows to be brought into contact in any desired proportions, in countercurrent or otherwise, and permits the performance of operations which require accurate control of the ratio of gas and liquid volumes, of temperature gradients, of the dissolution or saturation of one of the fluids (gas and liquid) in the other, or the progress of a chemical reaction.

The process of the invention can be carried out apparatus of various forms, but it is clear that the most advantageous form involves arranging the channels to form a body of revolution in which the fluids circulate with the groups of sequences operated in channels arranged coaxially about its axis. A simple preferred example of such apparatus is contained in a body of a generally cylindrical shape.

Figure 3:
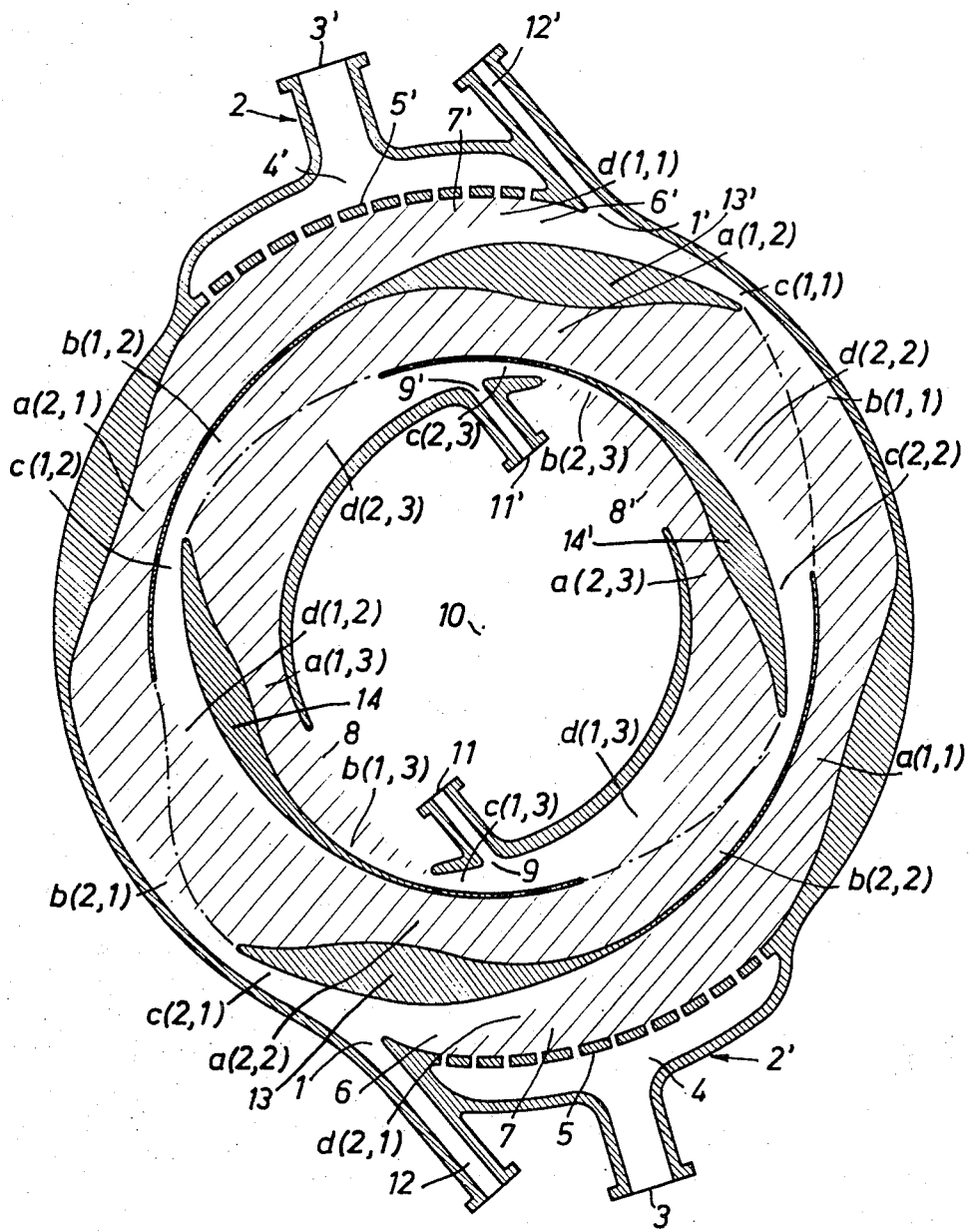

FIG. 3 shows in section transverse to its axis a cylindrical bodied apparatus of this type, providing, by way of example only, for operation of three groups of two sequences. Those portions of the channels in which the sequences are operated and in which the liquid flow therein is emulsified are shown by broad hatching, those portions in which the liquid flow is essentially unemulsified being unhatched. The boundaries between the separation zones and the emulsification zones of channels associated with sequences in adjacent groups are shown in chain-dotted lines, and the general direction of fluid circulation is counter-clockwise.

Liquid is drawn into the apparatus by suction through slot-shaped ducts 11, 11′ which can be connected to supply pipes (not shown). The liquid leaves the apparatus under pressure through slot-shaped ducts 12, 12′ which are situated on its periphery, and which may likewise be connected to outlet pipes (not shown). Gas is introduced under pressure at the periphery of the apparatus through orifices 3, 3′ and leaves in an expanded state through a central outlet pipe 10 extending perpendicular to the plane of the drawing. The system of references used in FIG. 2 to identify the zones of the channels formed within the apparatus in which the sequences forming the groups are operated has been retained in FIG. 3, with sequences 1 and 2 in each group, and groups 1, 2 and 3.

The organization of the sequences and groups in FIG. 3 is therefore as follows:

I. The outermost group comprises two special sequences (1,1) and (2,1); these two sequences in turn comprise:

1. zones $a$ (1,1) and $a$(2,1), emulsion expansion zones which are nozzles each in the form of a venturi; this arrangement is suitable in the special but practically important case in which the operating conditions of the apparatus are such, particularly as regards pressures and gas concentrations, that the speed of sound is below the highest emulsion velocity occurring in the group of sequences in question; this case is frequently encountered, because the speed of sound in emulsions is usually very low (only a few tens of meters per second); the expansion zones need not be of the form illustrated in the drawing, and it would also be possible to have entirely convergent expansion nozzles (if the highest speed achieved in the emulsion is lower than the local speed of sound) or even entirely divergent nozzles (if the speed of sound is exceeded in the zones $d$ (1,1) and $d$ (2,2));

2. zones $b$ (1,1) and $b$ (2,1), separation zones;

3. recompression zones $c$ (1,1) and $c$ (2,1), comprised by enclosed divergent channel portions;

4. zones $d$ (1,1) and $d$ (2,1), in which liquid inlet subzones 6, 6′ communicate respectively with
   a. liquid outlet orifices 1 and 1′, and mixing subzones 7, 7′ communicate respectively with
   b. emulsifiers 2 and 2′, each comprising a gas inlet (3 or 3′), an intermediate chamber (4 or 4′), a series of holes and slots (5 or 5′) in a perforated plate for injecting gas into the current.

II. The second group which is a conventional group of sequences (1, 2) and (2, 2), carried out in channels defining:

expansion zones $a$ (1,2) and $a$ (2,2);
separation zones $b$ (1,2) and $b$ (2,2);
recompression zones $c$ (1,2) and $c$ (2,2); and
emulsification zones $d$ (1,2) and $d$ (2,2).

III. The third and innermost group of sequences (1,3) and (2,3) is a special terminal group and is carried out in channels defining:

expansion zones $a$ (1,3) and $a$ (2,3);
separation zones $b$ (1,3) and $b$ (2,3), communicating with
   a. openings 8, 8′ providing a free surface for gas
   b. separation into the outlet 10, and water inlet orifices 9 and 9′;
recompression zones $c$ (1,3) and $c$ (2,3); and
emulsification zones $d$ (1,3) and $d$ (2,3).

In FIG. 3 of the drawings the walls defining the channels and other portions of the apparatus are indicated by close hatching. The form of these walls is such as to provide the required configuration of the zones described above.

In the detailed description given above, it has been assumed that the various zones in the channels are strictly localized; in practice, if the number of sequences in each group becomes very large the channels become relatively short and the functions of the different zones tend to overlap one another thus emulsification may then take place in regions where expansion is considerable, gas-liquid separation may commence in the expansion zone, recompression of the liquid can commence even before all the gas has been separated from the liquid, and so on. This limiting case, in which the walls separating the channels become so short that rather than considering the two-phase hydrodynamics of ducts it is more appropriate to consider hydrodynamics of turbine blades, is within the scope of the present invention.

It is seen in fact that solid parts such as 13, 13′ or 14, 14′ bounding the channels of the group 2 sequences in FIG. 3 have the shape of turbine blades, and generally speaking, perform the functions of the latter namely the transmission to the fluid within the apparatus of a reaction force having a centrifugal component (to withstand the differences in pressure between the stages) and a tangential component (to compensate for the frictional forces of the fluid on the walls).

It is seen that in general the invention makes it possible to carry out continuously any operation involving the bringing into intimate contact of a gas or mixture of gases and a liquid or mixture of liquids. Some examples of such operations will are recited below;

continuous heat exchange between a gas and a liquid; in this case since the flows of gas and liquid move as a whole in countercurrent and since the mass flows of gas and liquid can be controlled, the gas liquid ratio can also be controlled; a very important special case of such gas-liquid heat exchanges is that in which an exothermic or endothermic chamical reaction takes place within the gaseous phase, the liquid absorbing or supplying the heat of the reaction as it is generated or taken up; or conversely it is possible with the aid of a gas to cool a liquid within which an exothermic reaction takes place; a progressive chemical reaction may also be carried out in the course of which the temperature or pressure can be continuously varied;

continuous dissolution of one of the components of a gaseous mixture in a liquid;

continuous chemical reactions between a gas and a liquid, with the rate of removal from the system of the gaseous and liquid components being controlled so as to favor the desired product, which can be discharged either in the liquid phase or in the gaseous phase, according to the nature of the reaction; in addition, the pressure and/or temperature can likewise be caused to alter progressively and continuously with the ratio of the two phases, this alteration being in the sense most favorable to the chemical reaction concerned. Finally, chemical reactions in which the gas phase acts as catalyst may be carried out within the liquid, and also chemical reactions within the gaseous phase in which the liquid acts as catalyst; for this purpose this liquid may optionally contain solid catalyst particles in suspension.

The above listed operations are mentioned solely by way of example and do not in any way constitute an exhaustive list of all the operations in which the invention may advantageously be utilized.

I claim:

1. A process of intimately contacting a gas and a liquid, comprising contacting the gas and liquid in a plurality of continuously operating sequences each comprising four successive stages as follows;
    a. forming an emulsion of a supply of pressurized gas in a flow of liquid at a pressure close to that of the gas,
    b. permitting the emulsion so formed to expand so as to accelerate its flow,
    c. permitting the accelerated gas flow to separate from the accelerated liquid flow, and
    d. decelerating and hence recompressing the liquid at least to its initial pressure in stage (a);
    wherein the plurality of operating sequences are simultaneously operated in adjacent zones with the gas proceeding between the sequences by means of a first type of transfer in which the accelerated gas flow from stage (c) of one operating sequence is directed as the pressurized gas supply to stage (a) of a second operating sequence, and a second type of transfer in which the stage (a) of said first operating sequence receives its supply of pressurized gas from stage (c) of a third operating sequence,
    and wherein stage (c) of said first operating sequence is carried out in contact with stage (a) of said second operating sequence, the flows in the two stages having the same general direction and stage (a) of the first operating sequence is carried out in contact with stage (c) of said third operating sequence, the flows in the two stages having the same general direction.

2. A process according to claim 1, wherein the both type of transfer are accompanied by the transfer of a proportion of the liquid flow between said first and second and said third and first sequences respectively.

3. A process according to claim 2, wherein the direction of transfer of said liquid is in the one case from said second sequence to said first sequence, and in the other case from said first sequence to said third sequence.

4. A process according to claim 1, wherein said plurality of sequences are arranged in a plurality of groups, the sequences in any one of said groups being arranged end to end in a repeating series so far as the flow of liquid is concerned, the total flow of gas being processed being divided between the sequences in each group in proportion to the number of sequences in the group.

5. A process according to claim 4, wherein each stage is formed by the same number of sequences, the zones in which the sequences forming the groups are operated being arranged so the stages (c) of the sequences of a first group are operated in contact with the stages (a) of the sequences of a second group, the stage (d) of each sequence being operated in series with the stage (a) of the succeeding sequence in the same group, and wherein the flow of gas passes through all the stages in succession.

6. A process according to claim 1, wherein the first type of transfer takes place in-between contiguous zones having a combined profile relative to the direction of flow through the zones such as to promote expansion of the flow of gas passing therethrough.

7. A process according to claim 1, wherein the boundary along which stage (c) of the first operating sequence and stage (a) of the second operating sequence are operated in contact extends generally parallel the direction of flow in the two contacting stages, the rate of flow in stage (c) of the first operating sequence being the higher.

8. A process according to claim 7, wherein the two contacting stages are operated so that the flows therein follow generally concentric curvilinear paths, the flow in stage (c) of the first operating sequence following a path of larger radius.

9. A process according to claim 5, wherein the groups are operated in concentrically arranged zones.

10. A process according to claim 5, wherein the first type of transfer is accompanied by the transfer of a proportion of the liquid flow from said sequences of said second group to the sequences of said first group.

11. A process according to claim 10, wherein the stages (a) of the first group to which the gas is applied are supplied with pressurized gas from an external source, and wherein a proportion of the pressurized liquid from the stages (d) of this group is delivered to liquid outlets to compensate for that transferred from the sequences of the succeeding group.

12. A process according to claim 11, wherein the gas separating in the stages (c) of the sequences of the last group through which the gas passes is discharged, whilst additional liquid is supplied to the sequences of this group to compensate for that transferred to the sequences of the preceding group.

13. A process according to claim 12, wherein the groups are operated in concentrically arranged zones, with the last group through which the gas passes innermost.

14. A process according to claim 10, wherein the relative ratios of gas to liquid are adjusted by adjusting the proportion of the liquid flow transferred from group to group.

15. A process according to claim 12, including the step of controlling externally the rate at which liquid is circulated to the first group.

16. Apparatus for intimately contacting a gas with a liquid comprising a plurality of liquid/gas contacting means formed by walls defining a plurality of channels extending in the same direction about a central axis of the apparatus, each of said channels providing successively a divergent zone in which an opening is provided in the outer wall of the channel, an expansion nozzle, a convergent zone in which an opening is provided in the inner wall of the channel, and an enclosed divergent zone, said channels being interconnected with one another both end to end and by the openings in the inner and outer walls respectively of radially adjacent channels being made coicident, the openings in the outer walls of the radially outermost channels being in communication with means for connection to a source of pressurized gas, and the openings in the inner walls of the radially innermost channels being in communication with a gas outlet.

17. Apparatus according to claim 16, wherein said channels are arranged end to end in closed loops about the central axis to form a plurality of groups each comprising the same number of contacting means, the openings in the inner walls of the channels of one group coinciding with the openings in the outer walls of the channels of the group next within said first group, the openings in the outer walls of the channels of the outermost group being in communication with the means for connecting said openings to a source of pressurized gas, and the openings in the inner walls of the channels of the innermost group being in communication with the gas outlet.

18. Apparatus according to claim 17, further including liquid inlets connected to the contacting means of said innermost group; and liquid outlets connected to the contacting means of said outermost group.

19. Apparatus according to claim 16, wherein the expansion nozzle defined by each channel is in the form of a venturi.

20. Apparatus according to claim 17, wherein the means for connecting said openings in the outer walls of the channels of the outermost group of contacting means each comprise gas admission means communicating with an intermediate chamber having a perforated plate forming one wall thereof and bounding said opening.

21. Apparatus according to claim 17, constructed in the general form of a cylinder, with the channels extending about a common axis which coincides with that of the cylinder.

* * * * *